United States Patent Office 3,374,175
Patented Mar. 19, 1968

3,374,175
PHENYL ETHER COMPOSITIONS
Karl J. Sax, Orinda, Calif., Walfred S. Saari, Ambler, Pa., and Clarence L. Mahoney, Berkeley, Calif., assignors to Shell Oil Company, New York, N.Y., a corporation of Delaware
No Drawing. Continuation-in-part of abandoned application Ser. No. 701,296, Dec. 9, 1957. This application Apr. 29, 1960, Ser. No. 25,547
16 Claims. (Cl. 252—52)

This application is a continuation-in-part of patent application Ser. No. 701,296, filed Dec. 9, 1957, now abandoned.

This invention relates to blends of certain polyphenyl ethers. More particularly, it relates to blends especially suitable for use as synthetic lubricating oils and operating fluids capable of functioning over a wide temperature range and especially suitable for use at extremely high operating temperatures and in the presence of ionizing radiation.

Aircraft and gas turbine engine lubricants require special properties such as high temperature stability which are not possessed by conventional lubricants. They must possess a high viscosity index in order to provide adequate lubrication over a wide range of temperatures. They must have high oxidation and thermal stability so that they retain their useful properties after operation for a long time at high temperatures. It is preferred that they have as low a pour point as possible in order that they may function properly at low temperatures without auxiliary heating equipment and high flash points are described in order to avoid risk of fire during high temperature operation and loss of lubricant by evaporation.

Many fluids have been proposed for operation under such conditions but, for the most part, each of them inherently possesses one or more shortcomings making their use undesirable in that respect. For example, the silicone fluids are stable at high temperatures but are notorious for their poor lubricating properties. Ester lubricants, on the other hand, are excellent where low operating temperatures are concerned due to their low pour points and their high viscosity indices but for the most part do not have satisfactory oxidation and thermal stability at temperatures in the order of 400° F. and above.

The mineral lubricating oils which exhibit satisfactory low temperature viscosities have generally been found to have flash points that are dangerously low and high temperature viscosities that are below those required. In other words, when the mineral oil is thin enough at low temperatures, it is too volatile at high temperatures, and is also too thin to possess satisfactory lubricity. It has been found generally speaking that additive agents do not enhance the essential properties to a satisfactory extent.

Recent studies in the synthetic lubricant field have indicated that certain restricted classes of polyphenyl ethers have excellent thermal stability and oxidation resistance at extremely high temperatures. Unfortunately, however, most of these compounds are solids or liquids of high viscosity at ordinary temperatures. Consequently, it is necessary, if they are to be used without further modification as known heretofore, to install heating equipment so as to prevent the operating fluid from solidifying in the lines or tanks.

It is an object of the present invention to provide improved operating fluids especially useful for operation of engines and motors at high operating temperatures. It is another object of the present invention to provide operating fluids and particularly lubricating oils possessing not only high thermal stability and oxidation resistance but also good low temperature properties. It is a particular object of this invention to provide polyphenyl ether compositions having pour points in a useful lubricating oil range. Other objects will become apparent during the discussion of the invention.

Now, in accordance with the present invention, compositions are provided which are especially useful for lubricating purposes and operating fluids such as hydraulic fluids which comprise a mixture of polyphenyl ethers having the general configuration:

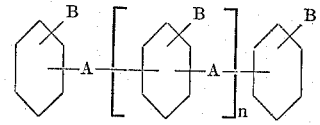

wherein $n$ is a whole number from 1 to 6, the A's are radicals of the group consisting of oxygen and dimethyl methylyl, at least one of which is oxygen and B is a radical of the group consisting of hydrogen, alpha-cumyl and tertiary butyl, a first portion X of the mixture being one in which all of the molecules have at least two-thirds of the pairs of radicals A attached to carbon atoms in the same phenyl ring in meta positions relative to each other, and a second portion Y of the mixture being one in which all of the molecules have less than about two-thirds of the pairs of radicals A attached to carbon atoms in the same phenyl ring in the meta position to each other, the mole ratio of the first portion to the second portion being between about 1:2 and about 9:1.

In its preferred aspect, the mixture of polyphenyl ethers are those wherein $n$ is an integer from 2 to 4 and the first portion referred to in the above is one in which all of the molecules have oxygen linkages between phenyl radicals and the same for the second portion, the second portion also being characterized in that all of the molecules have less than about ½ of the pairs of oxygen linkages in meta positions to each other. Still more preferably, the latter are most desirable mixtures when the mole ratio of the first portion to the second portion is between about 1.5:1 and about 7.5:1.

An important aspect of the present invention comprises the discovery that such mixtures as those described herewith possesses low pour points and have extremely high thermal stability both either in the presence and in the absence of air as well as in the presence of ionizing radiation. The use of the present operating fluids is contemplated over a wide range of temperatures since radiation resistant lubricants and operating fluids are necessary for the operation of radiation emitting apparatus over a wide temperature range. Normally, however, in the operation of radiation equipment the primary requirement is for resistance to radiation so that such materials may be used as heat exchange fluids, moderator fluids, lubricants and hydraulic fluids.

In one preferred aspect of this invention, a maximum number of isomeric polyphenyl ethers are present in the composition since it has been found that even remarkably small amounts of some of the higher melting isomers provide an appreciable depression in the melting point of the mixtures thereof. This can be illustrated by the following data concerning mixtures of the six possible isomers of bis(phenoxyphenyl)ether:

TABLE 1.—COMPOSITION OF EUTECTIC MIXTURES

| Number of Components | Eutectic Temp., °F. | Isomer Composition of Eutectic Mixture, Percent wt. | | | | | |
|---|---|---|---|---|---|---|---|
| | | mm | mp | mo | op | pp | oo |
| 2 | 79.9 | 54.5 | 45.5 | | | | |
| 3 | 75.0 | 48.3 | 40.3 | 11.4 | | | |
| 4 | 72.5 | 44.8 | 38.0 | 10.6 | 6.6 | | |
| 5 | 71.8 | 44.5 | 37.7 | 10.5 | 6.5 | 0.8 | |
| 6 | 71.6 | 44.3 | 37.4 | 10.4 | 6.5 | 0.8 | 0.5 |

It has been found that particularly useful compositions of the tetraphenyl ethers are those in which the polyphenyl ether portion X is present in the mixture to the extent of 40–55 mole percent, while the polyphenyl ether portion Y is present in an amount between 35 and 50 mole percent.

A preferred form of the present invention comprises a mixture of the subject classes of polyphenyl ethers wherein at least 35 mole percent of the mixture contains both meta linkages and ortho or para linkages within the same molecule. Desirable properties are promoted when the proportion of meta linkages is at least two-thirds of those present and preferably between about 75 and 90 percent of the linkages, the remaining being either ortho or para linkages, preferably para.

When the polyphenyl ether comprises one in which there is an oxygen linkage between two groups of polyphenyl linkages, it is sufficient that at least 50 percent of the linkages other than the one specified oxygen linkage are in the meta position relative to said ether linkage. As stated hereinbefore, these additional linkages between phenyl radicals may be either oxygen or isopropylidene. Table 2, which follows, lists typical polyphenyl ethers which may comprise principal or minor components in the mixtures under consideration.

TABLE 2

Bis(meta-phenoxyphenyl)ether
Bis(para-phenoxyphenyl)ether
Bis(ortho-phenoxyphenyl)ether
Meta-bis(meta-phenoxyphenoxy)benzene
Meta-bis(para-phenoxyphenoxy)benzene
Para-bis(meta-phenoxyphenoxy)benzene
Meta [(meta-phenoxyphenoxy)(meta-tert-butylphenoxyphenoxy)]benzene
Meta[(meta-alpha-cumylphenoxyphenoxy)(meta-phenoxyphenoxy)]benzene
Meta[(meta-tert-butylphenoxyphenoxy)(para-tert-butylphenoxyphenoxy)]benzene It is within the contemplation of the present invention to provide compositions wherein no unsubstituted polyphenyl ethers are present, the compositions being composed of mixtures of tertiary butyl substituted polyphenyl ethers, alpha cumyl substituted polyphenyl ethers or polyphenyl ethers wherein a substantial portion of the oxygen linkages are replaced with isopropylidene linkages. Still more explicitly, these latter types of mixtures may comprise two or more tertiary butyl substituted polyphenyl ethers, two or more alpha cumyl substituted ethers or two or more polyphenyl ethers containing isopropylidene linkages substituted for a portion of the oxygen linkages. It is also possible to provide mixtures comprising one or more tertiary butyl substituted polyphenyl ethers with one or more of the other two types of derivative classes.

Several means are available for the in situ preparation of the mixtures in situ although it is possible to select or prepare individual species of polyphenyl ethers and mix them. One process comprises reaction between metal phenates and bromo phenyl ethers to form mixtures of polyphenyl ethers according to the following generally characterized reaction:

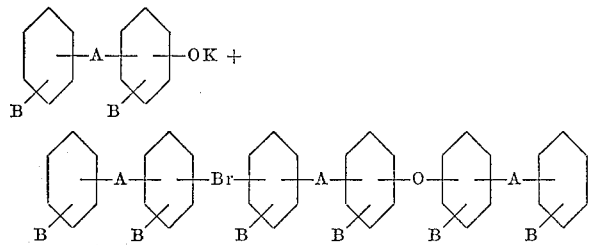

In the above formulae the radicals A may be oxygen (sulfur, selenium), or isopropylidene while the radicals B may be alpha-cumyl, tertiary butyl or hydrogen. It will be understood that throughout the specification wherever rings are used as in the above equations these represent phenyl radicals and that any substituents, such as B, represent replacement for hydrogen atoms normally attached to the phenyl ring.

According to the above reaction, a mixture of potassium phenates may be reacted with a single bromophenyl compound to give a mixture of polyphenyl ethers. It also is possible to react a single potassium phenate with a mixture of bromophenyl compounds to arrive at another suitable mixture of polyphenyl ethers. Thirdly, a preferred combination comprises mixtures of both potassium phenates and of bromo compounds. It is possible by this general reaction to use mixtures of potassium phenates wherein the phenyl radicals are unsubstituted but the species vary with respect to the position of the inter phenyl linkages. The same may apply to the bromophenyl compounds. By this type of reaction, it will be seen that at least one of the inter phenyl linkages is an ether oxygen radical but it is preferred that at least about two-thirds of the linkages between phenyl radicals be oxygen, the remaining being either oxygen or isopropylidene radicals. A specific reaction of this type comprises the condensation occurring between a mixture of meta and para-alkali metal phenoxyphenates with para-bromophenylphenyl ether to give a mixture of meta-phenoxyphenyl-para-phenoxyphenyl ether and bis(para-phenoxyphenyl)ether. The meta-phenoxyphenate is utilized in a proportion sufficient to provide a product wherein at least about 50 percent of the linkages between phenyl radicals are meta linkages relative to each other. Consequently, it is preferred to utilize, say, 4 moles of the potassium meta-phenoxyphenate to each mole of the potassium para-phenoxy phenate.

The conditions under which such a reaction may occur comprise heating the two types of reacting materials (using a 5–10 percent molar excess of the potassium or other alkali metal phenate relative to the bromo phenyl compound) for a period between about 0.5 and about 10 hours at a temperature between about 150° C. and about 300° C. Preferably in the presence of a catalyst such as copper, the catalyst being present in about 0.1 and about 20 grams per mole of the alkali metal phenate. The hot reaction mixture is then diluted by pouring into a solvent such as cold toluene or xylene and filtering the alkali metal halide which is the by-product of the reaction.

It is, of course, possible to mix the specific individual alkali metal phenates which it is desired to react with a bromo phenyl compound. Such mixtures also may be formed synthetically by rearrangement of substituent positions such as by heating para bromo phenoxy phenyl ether in the presence of an alkali such as potassium hydroxide for a period of 1–10 hours at a temperature in the order of 250–350° C. This results in a partial rearrangement of the substituent positions to provide a mixture comprising potassium meta phenoxy phenate and potassium para phenoxy phenate. Suitable bromo compounds for use in this type of reaction are listed in Table 3 which follows:

TABLE 3

1-alpha cumyl-3-bromobenzene
1-alpha cumyl-2-bromobenzene
Dimethyl(meta-tert-butylphenyl)(meta-bromophenyl)methane
Phenyl(metabromophenyl)ether
(Meta-tert-butylphenyl)(meta-bromophenyl)ether
Phenyl(2-tert-butyl-3-bromophenyl)ether
Phenyl(para-bromophenyl)ether
Phenyl(ortho-bromophenyl)ether
(Ortho-, meta-, and para-tert-butylbromobenzenes)
(Ortho-tert-butylphenyl)(ortho-bromophenyl)ether
(Meta-tert-butylphenyl)(para-bromophenyl)ether
(Para-tert-butylphenyl)(para-bromophenyl)ether Suitable alkali metal phenates which may be utilized in the above reaction are given in Table 4.

TABLE 4

Potassium meta-phenoxyphenate
Potassium para-phenoxyphenate
Potassium ortho-phenoxyphenate
Sodium meta phenoxyphenate
Potassium meta alpha-cumylphenate
Potassium meta(meta-tert-butylphenoxy)phenate
Sodium para(para-tert-butylphenoxy)phenate
Potassium meta-phenoxy(para-tert-butylphenate)
Lithium meta(meta-phenoxyphenoxy)phenate Another type of reaction which may be utilized for the production of mixtures of polyphenyl ethers is the reaction between dibromobenzenes and alkali metal phenates. Again, as in the previous type of reaction, either or both of these individual components may be mixtures of species or may be a single specie with the single limitation that one of the two components must be a mixture containing a sufficient amount of meta linkages to provide the reaction product with a minimum of 30 percent of meta linkages. Preferably, the bromo benzenes which may be unsubstituted or may bear tertiary butyl or alpha cumyl substituents as shown in Table 5 which follows:

TABLE 5 o-, m- and p-dibromobenzenes
1-tert-butyl-3,5-dibromobenzene
1-tert-butyl-2,4-dibromobenzene
1-tert-btuyl-2,6-dibromobenzene
1-alpha-cumyl-3,4-dibromobenzene
1-alpha-cumyl-2,5-dibromobenzene
1-alpha-cumyl-3,6-dibromobenzene
1-alpha-cumyl-4,6-dibromobenzene
1-tert-butyl-3,6-dibromobenzene
1-tert-butyl-2,5-dibromobenzene
1-alpha-cumyl-3,5-dibromobenzene The alkali metal phenates with which the dibromobenzenes are to be condensed are those listed hereinbefore or in Table 4. The general reaction proceeds according to the following equation wherein the constituents A and B are those defined hereinabove:

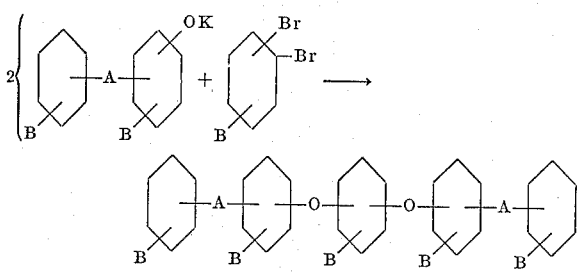

In order to obtain the lowest possible pour point and at the same time retain high thermal stability and oxidation resistance, a preferred reaction of this second variety comprises the reaction between a mixture of ortho, meta and para dibromobenzene (50–80 percent of meta dibromobenzene) with a mixture of potassium meta and para phenoxyphenols. By this reaction at least about 50 percent by weight of the product comprises meta bis(meta-phenoxyphenoxy)benzene, the remaining components of the reaction product being isomers thereof. A lubricant consisting essentially of a mixture of polyphenyl ethers, a first ether being m-bis(m-phenoxyphenoxy) benzene, the remaining ethers being ortho- and para-isomers thereof, the mol ratio of the meta ether to the remaining ethers being between about 1:2 and about 9:1, is appropriate. This reaction is preferably conducted at temperatures between about 150° C. and about 300° C. for periods of between about ½ and about 10 hours.

Other processes may be employed for the production of higher polyphenyl ethers, although the latter may be often obtained as higher boiling by-products of the processes already described. A useful intermediate for the production of hexaphenyl and heptaphenyl ethers is phenoxyphenoxyphenol. This can be produced by several alternative routes. One method comprises the condensation of a dibromobenzene with phenoxyphenoxyphenol to form phenoxyphenoxybromobenzene which upon reaction with aqueous caustic (KOH) and in the presence of copper at temperatures in the order of 200–300° C. results in the formation of phenoxyphenoxyphenol. Another route for the preparation of this intermediate comprises the reaction of phenoxybromobenzene with methoxyphenol to form phenoxyphenoxy(methoxybenzene) which upon reaction with caustic forms the desired phenoxyphenoxyphenol. In order to form the hexaphenyl ether it is only necessary to condense phenoxyphenoxyphenol with phenoxyphenoxy bromobenzenes. On the other hand, heptaphenyl ether may be prepared by the reaction of two moles of phenoxyphenoxyphenol with a dibromobenzene.

Of course, in the preparation of mixtures of polyphenyl ethers to form compositions in accordance with this invention, it is preferred that mixtures of one or of both of the components be employed, by mixtures being meant the use of two or more isomers of the same compound.

Although the synthetic lubricating oils of the present invention are superior lubricants as compared with the individual polyphenyl ethers comprising the individual components of these compositions, nevertheless for certain applications they may be improved by the addition of modifying materials such as pour point depressants, viscosity index improvers, thickeners, anti-oxidants, anti-corrosive agents, load-bearing (extreme pressure) additives and anti-lacquering agents.

Where temperatures below about 300° F. are anticipated during the useful life of the lubricant, pour point depressants and viscosity index improvers such as the polymers of esters of acrylic acid or of 2-alkyl acrylic acid may be utilized. The most suitable polymers have a relative molecular weight between 100 and 180 centistokes but polymers having a relative molecular weight as high as 400 centistokes are also useful. The expression "relative molecular weight" means the centistoke viscosity at 100° F. and of a 30 percent by weight solution of the polymer in toluene. Typical esters, the polymers of which may be so employed, are the methyl, ethyl, n-propyl, isopropyl, isobutyl, lauryl, phenyl, or benzyl esters of acrylic, methacrylic, 2-ethylacrylic and 2-propylacrylic acids. Typical suitable and commerically available polymers are those of $C_{8-12}$ alkyl methacrylates. The polymers may be homopolymers of a single ester or may be copolymers of a mixture of such esters and the term "polymer" as used herein is intended to be construed accordingly. The polymers may be used in the present synthetic lubricating oils to the extent of 2 to 30 percent by weight based on the total weight of the liquid esters and the polymers. Generally from 5 to 15 percent by weight is the most suitable proportion within the aforesaid range.

Polymers of acrylic acid esters and methacrylic acid esters suitable for use in the present synthetic lubricating oils are available under the trade name "Acryloid." They are generally available as concentrated dispersions in a solvent and these concentrated dispersions can be used as such.

Some of the commercially available polymers suitable for use in the synthetic lubricating oils of the present invention are not shear stable and if such polymers are employed, it is desirable to subject them to a shearing action, for example, by passing them through an injector nozzle, before incorporating them in the lubricating oils. Alternatively, the polymers may be blended with one or more of the components of the present lubricating oils and subjected to such a shearing action before use.

Suitable anti-lacquering agents for addition to the present synthetic lubricating oils are the salts of aromatic carboxylic acids or of phenols with a metal of Group II of the Periodic Table, which salts are soluble in the synthetic lubricating oil. These salts increase the oxidation and thermal stability of the synthetic lubricating oils under high temperature conditions of working and avoid the lacquering of bearings. Of the Group II metals, zinc and calcium are the most suitable for the present purpose, but beryllium, magnesium, strontium, cadmium, barium or mercury salts may be used. The aromatic carboxylic acid or phenol chosen should have sufficient oleophilic properties to ensure that the metal salt employed is suitable in the liquid ether mixture. Preferably such salts are used in such amounts that there is a metal content in the finished lubricating oil of between 0.01 and 1.0 percent by weight. Normal or basic salts or mixtures of normal and basic salts may be employed. Suitable aromatic acids for use in the form of their Group II metal salts in the present lubricating oils are benzoic acid, naphthoic acid, 4-tertiary-butyl benzoic acid, 2,4-di-tertiary butylbenzoic acid, diisopropylsalicylic acids, octyl-salicylic acids, pentadecenylsalicylic acids, octadecylsalicylic acids, stearylsalicylic acids and octyl-4-hydroxybenzoic acids. The salts of the alkylated hydroxy benzoic acids are particularly useful and they may be used in admixture with one another. Thus there may be used salts of the mixtures of alkylated hydroxybenzoic acids obtained by reacting salicylic acid or 4-hydroxybenzoic acid with a mixture of alkenes, such as a mixture obtained by the cracking of paraffin wax, or with a mixture of alcohols in the presence of a suitable condensing agent of the Friedel-Crafts type. Similarly salts of a mixture obtained by alkylating a phenol with such a mixture of alkenes or alcohols and converting the alkyl phenols produced into alkyl salicylic acids by the Kolbe-Schmidt reaction may be used.

Suitable phenols for use in the form of their Group II metal salts in the present lubricating oils are phenol itself, the naphthols, the cresols and the higher alkylated phenols, such as the amyl, octyl, nonyl, decyl, tetradecyl, pentadecenyl and octadecyl phenols. Salts or mixtures of alkyl phenols, for example, those made by the alkylation of a phenol with mixtures of alkenes, can be employed and are preferred on account of their lower melting points as compared with those of pure alkyl phenols. Mixtures of alkenes derived from paraffin wax by cracking or from higher fatty alcohols by dehydration are valuable and easily accessible starting materials for the manufacture of such mixtures of phenols. Thus, a mixture of alkyl phenols made by the alkylation of phenol or a cresol or 1- or 2-naphthol with a mixture of alkenes containing from 8 to 18 carbon atoms in the molecule and obtained by the above-mentioned procedure, can be employed. More than one alkyl or alkenyl group may be present in the phenol as in the case of compounds made by the di- or tri-alkylation of phenols with alkenes, alkyl halides, alcohols or ethers, or of compounds made by the mono-alkylation of, for example, a cresol, a xylenol, carvacrol, cardanol. Other nuclear substituents may be present provided that they do not unduly reduce the oil-solubility of the phenol. Thus, halogen, alkoxy, alkyl mercapto and alkyl amino groups may be present in the phenol.

Effective metal salts for use in the lubricating oils of the present invention are the zinc salts of alkylated salicylic acids containing from 8 to 20 carbon atoms in the alkyl group. A particularly effective compound is the zinc salt of a mixture of alkyl salicylic acids made by alkylating phenol with a mixture of alkenes containing 14 to 18 carbon atoms in the molecule and converting the resulting alkyl phenols into the corresponding salicylic acids by the Kolbe-Schmidt reaction.

Where high load carrying capacity is required an extreme pressure additive may be added to the synthetic lubricating oils of this invention. A good type of extreme pressure additive for the lubricating oils of this invention is the trialkyl, triaryl or trialkaryl phosphates, such as trioctyl or tricresyl phosphate. Extreme pressure agents of the halo-alkylphosphonate type, such as monobutyl hydrogen trichloromethylphosphate type, such as monobutyl-hydrogen trichloromethyl-phosphonate and its amine salts such as its salt with di(2-ethylhexyl)amine are also suitable.

The following examples illustrate compositions according to the present invention:

EXAMPLE I

Potassium meta-phenoxyphenate—1.1 mol
Potassium para-phenoxyphenate—1.1 mol and
(Para-bromophenyl)phenyl ether—2 mols were heated for 4 hours at 200–225° C. The reaction mixture was poured into toluene, filtered, dried, and the solvent distilled. The product was a mixture of (meta-phenoxyphenyl)(para - phenoxyphenyl)ether and bis(para-phenoxyphenyl)ether.

In each of the following examples essentially the same reaction conditions were employed.

EXAMPLE II

Reactants

Potassium meta-phenoxyphenate—1.1 mol
Potassium para-phenoxyphenate—1 mol
Mixture of isomeric dibromobenzenes (60 percent meta isomer)—1 mol

Product

Mixture of isomeric bis(phenoxyphenyl)benzenes, including about ⅓ of meta-bis(meta-phenoxyphenoxy)benzene

EXAMPLE III

Reactants

Potassium meta-(alpha-cumyl)phenate—1.1 mol
Potassium para-(alpha-cumyl)phenate—1 mol
(Para-bromophenyl)phenyl ether—1 mol

Product (Meta-alpha-cumylphenyl)(para-phenoxyphenyl)ether
and
(Para-phenoxyphenyl)(para-alpha-cumylphenyl)ether

EXAMPLE IV

Reactants

Potassium meta-(alpha-cumyl)phenate—1.1 mol
Potassium para-(alpha-cumyl)phenate—1.1 mol, mixture of isomeric dibromobenzenes—1 mol

Product

Mixture of (alpha-cumylphenoxy)benzenes predominating in meta bis(meta-alpha-cumylphenoxy)benzene

EXAMPLE V

Reactants

Potassium meta-phenoxy phenate—1.1 mol
Potassium para-phenoxyphenate—1 mol, dimethyl (phenyl)(para-bromophenyl)methane

Product (Metaphenoxyphenyl)(para-alpha-cumylphenyl)ether
and
(Paraphenoxyphenyl)(para-alpha-cumylphenyl)ether

EXAMPLE VI

Reactants

Potassium meta-phenoxyphenate—1.1 mol
Potassium para-phenoxyphenate—1 mol, mixture of isomeric tertbutyl dibromobenzenes

Product

Mixture of isomeric (phenoxyphenyl)-tertbutylbenzenes, predominating in meta-bis(phenoxyphenyl)tert-butyl benzenes.

EXAMPLE VII

Reactants

Potassium 2-tert-butyl-3-phenoxyphenate—1.1 mol
Potassium 4-phenoxyphenate—1 mol
(Parabromophenyl)phenyl ether—1 mol

Product (Paraphenoxyphenyl)(ortho-tert-butyl-meta-phenoxyphenyl)ether

EXAMPLE VIII

Reactants

Potassium 2-tertbutyl-3-phenoxyphenate—1.1 mol
Potassium 4-phenoxyphenate, mixture of isomeric dibromobenzenes, containing 60 percent meta isomer.

Product

Meta-bis(2-tert-butyl-3-phenoxyphenyl)ether and Para-bis(4-phenoxyphenyl)ether.

EXAMPLE IX

When a mixture of phenoxyphenols and of bromophenyl-phenyl ethers is reacted, a mixture of tetraphenyl ethers is obtained. The composition of the reactants and the resultant tetraphenyl ether are as follows:

| Reactant | Isomer Content | | |
|---|---|---|---|
| | m | p | o |
| Phenoxyphenol | 54 | 44 | 2 |
| Bromophenyl Phenyl Ether | 82 | 2 | 16 |
| Resultant Isomer | mm | mp | mo | op | pp | oo |
| Isomer Distribution, percent w | 44.4 | 37.1 | 10.3 | 7 | 0.9 | 0.4 |
| Calculated Eutectic Composition, percent w. | 44.3 | 37.4 | 10.4 | 6.5 | 0.8 | 0.5 |

We claim as our invention:

1. A composition consisting essentially of a mixture of polyphenyl ethers, one of which is a polyphenyl ether having the general formula

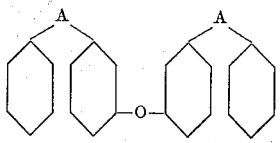

and another of which is a polyphenyl ether having the general formula

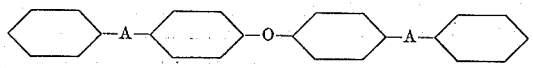

wherein A is a radical of the group consisting of oxygen and

the mol ratio of the first ether to the second ether being between about 1:2 and about 9:1.

2. A composition consisting essentially of a mixture of polyphenyl ethers, one of which is a polyphenyl ether having the general formula

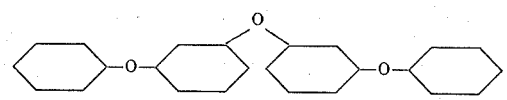

and another of which is a polyphenyl ether having the general formula

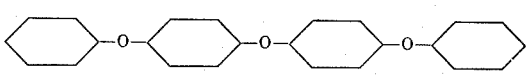

the mol ratio of the first ether to the second ether being between about 1:2 and about 9:1.

3. A composition consisting essentially of a mixture of polyphenyl ethers one of which is a polyphenyl ether having the general formula

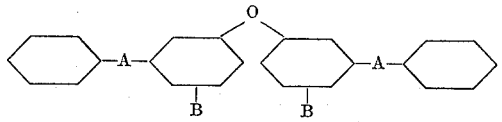

and another of which is a polyphenyl ether having the general formula

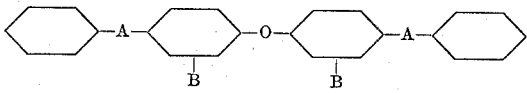

wherein A is a radical of the group consisting of oxygen and

and B is a radical of the group consisting of tert-butyl, alpha-cumyl and hydrogen, the mol ratio of the first ether to the second ether being between about 1:2 and about 9:1.

4. A composition consisting essentially of a mixture of polyphenyl ethers, a first ether being m-bis(m-phenoxyphenoxy)benzene, the remaining ethers being ortho- and para-isomers thereof, the mol ratio of the meta-ether to the remaining ethers being between about 1:2 and about 9:1.

5. A composition consisting essentially of a mixture of polyphenyl ethers having the general formula

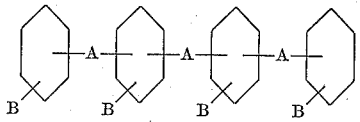

wherein A is a radical of the group consisting of oxygen and

at least one of the radicals A being oxygen, and B is a radical of the group consisting of tert-butyl, alpha-cumyl and hydrogen, a first polyether being one in which at least ⅔ of the pairs of radicals A are attached to carbon atoms in the same phenyl rings in meta positions relative to another radical A and a second polyether being one in which there are no meta-positioned pairs of radicals A, the mol ratio of the first to the second ether being about 1:2 and about 9:1.

6. A composition consisting essentially of a mixture of polyphenyl ethers having the general configuration

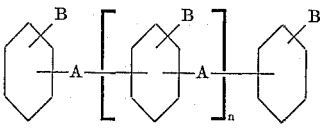

wherein $n$ is a whole number from 2 to 6, the A's are radicals of the group consisting of oxygen and

at least one of which is oxygen and B is a radical of the group consisting of hydrogen, alpha-cumyl and tertiary-butyl, a first portion of the mixture being one in which all of the molecules have at least ⅔ of the pairs of radicals A attached to carbon atoms in the same phenyl rings in meta positions relative to each other and the second portion of the mixture being one in which all of the molecules have less than ⅔ of the pairs of radicals A attached to carbon atoms in the same phenyl ring in meta positions to each other, the mol ratio of the first portion to the second portion being between about 1:2 and about 9:1.

7. A composition consisting essentially of a mixture of polyphenyl ethers having the general configuration

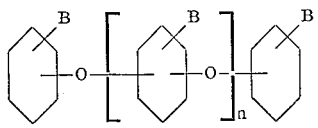

wherein $n$ is a whole number from 2 to 4, B is a radical of the group consisting of hydrogen, alpha-cumyl and tertiary butyl, a first portion of the mixture being one in which all of the molecules have at least ½ of the pairs of oxygen linkages in meta positions relative to each other and the second portion of the mixture being one in which all of the molecules have less than ½ of the pairs of oxygen linkages in meta positions to each other, the mol ratio of the first portion to the second portion being between about 1:1.5 and 7.5:1.

8. A composition consisting essentially of a mixture of polyphenyl ethers having the general configuration

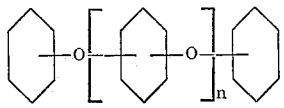

wherein $n$ is a whole number from 2 to 6, a first portion of the mixture being one in which all of the molecules have at least ⅔ of the pairs of oxygen atoms attached to carbon atoms in the same phenyl rings in meta positions relative to each other and the second portion of the mixture being one in which all of the molecules have less than ⅔ of the pairs of oxygen atoms attached to carbon atoms in the same phenyl ring in meta positions to each other, the mol ratio of the first portion to the second portion being between about 1:2 and about 9:1.

9. A composition according to claim 8 wherein $n$ is 3.

10. A composition consisting essentially of tetraphenyl ethers 40–55 percent being bis(meta-phenylphenoxy)ether, 35–50 percent being (metaphenoxyphenyl)-(para-phenoxyphenyl)ether the balance being other isomeric tetraphenyl ethers.

11. A composition consisting essentially of an isomeric mixture of polyphenyl ethers having the formula and general configuration as in claim 8 and in which there are from 4 to 6 phenyl radicals per molecule of which 75–90% of the phenyl ether linkages are meta linkages and 25–10% are para linkages.

12. A composition consisting essentially of an isomeric mixture of polyphenyl ethers having the formula and general configuration as in claim 8 and in which there are from 4 to 6 phenyl radicals per molecule of which 75–90% of the phenyl ether linkages are meta linkages and 25–10% are ortho linkages.

13. A composition consisting essentially of an isomeric mixture of polyphenyl ethers having from 4 to 5 phenyl radicals per molecule of which 75–90% of the phenyl ether linkages are meta linkages and 25–10% are para linkages.

14. A composition consisting essentially of an isomeric mixture of polyphenyl ethers having from 4 to 5 phenyl radicals per molecule of which 75–90% of the phenyl ether linkages are meta linkages and 25–10% are ortho linkages.

15. A composition consisting essentially of a mixture of polyphenyl ethers having the general configuration

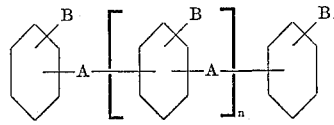

wherein $n$ is a whole number from 2 to 4, the A's are radicals of the group consisting of oxygen and

at least one of which is oxygen and B is a radical of the group consisting of hydrogen, alpha-cumyl and tertiary-butyl, a first portion of the mixture being one in which all of the molecules have at least ⅔ of the pairs of radicals A attached to carbon atoms in the same phenyl rings in meta positions relative to each other and the second portion of the mixture being one in which all of the molecules have less than ⅔ of the pairs of radicals A attached to carbon atoms in the same phenyl ring in meta positions to each other, the mol ratio of the first portion to the second portion being between about 1:2 and about 9:1.

16. A mixture of polyphenyl ethers having the formula

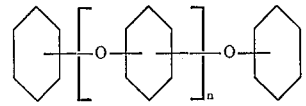

where $n$ is an integer from 2 to 4, and 50 to 90 percent of the phenylene radicals are meta-phenylene radicals.

References Cited

UNITED STATES PATENTS

| | | | |
|---|---|---|---|
| 1,867,968 | 7/1932 | Dow | 252—52 |
| 1,882,368 | 10/1932 | Marschner | 260—612 |
| 1,905,850 | 4/1933 | Grebe et al. | 252—52 X |
| 2,079,279 | 5/1937 | Coleman et al. | 260—613 |
| 2,095,619 | 10/1937 | Stoesser et al. | |
| 2,128,109 | 8/1938 | Wiezevich | 252—52 X |
| 2,149,789 | 3/1939 | Rittler et al. | 252—73 |
| 2,347,393 | 4/1944 | Bousquet et al. | 260—613 X |
| 3,080,321 | 3/1963 | Blake et al. | 252—52 X |

OTHER REFERENCES

Ann. Chem., vol. 350 (1906), pp. 84 and 101.
Ann. Chem., vol. 517 (1935), pp. 67–72.

BERNARD HELFIN, *Primary Examiner.*

J. GREENWALD, A. SULLIVAN, D. E. WYMAN, *Examiners.*

G. O. ENOCKSON, P. C. BAKER, R. E. HUTZ, E. W. GOLDSTEIN, *Assistant Examiners.*